(12) United States Patent
Kinoshita

(10) Patent No.: US 11,928,148 B2
(45) Date of Patent: Mar. 12, 2024

(54) INFORMATION PROCESSING APPARATUS, METHOD OF CONTROLLING THE SAME, NON-TRANSITORY COMPUTER-READABLE STORAGE MEDIUM, AND INFORMATION PROCESSING SYSTEM

(71) Applicant: CANON KABUSHIKI KAISHA, Tokyo (JP)

(72) Inventor: Yuichi Kinoshita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 680 days.

(21) Appl. No.: 17/097,351

(22) Filed: Nov. 13, 2020

(65) Prior Publication Data

US 2021/0149945 A1 May 20, 2021

(30) Foreign Application Priority Data

Nov. 19, 2019 (JP) .................................. 2019-209007

(51) Int. Cl.
| | |
|---|---|
| *G06F 16/55* | (2019.01) |
| *G06F 16/51* | (2019.01) |
| *G06F 16/538* | (2019.01) |
| *G06F 16/93* | (2019.01) |
| *G06F 21/44* | (2013.01) |
| *H04N 23/60* | (2023.01) |
| *H04N 23/661* | (2023.01) |

(52) U.S. Cl.
CPC ............ *G06F 16/51* (2019.01); *G06F 16/538* (2019.01); *G06F 16/93* (2019.01); *G06F 21/44* (2013.01); *H04N 23/64* (2023.01); *H04N 23/661* (2023.01)

(58) Field of Classification Search
CPC .. H04N 19/105; H04N 5/23206; H04N 19/50; H04N 19/159; G07C 13/00; G06F 16/51; G06F 16/93; G06T 3/40; G06T 5/20
See application file for complete search history.

(56) References Cited

U.S. PATENT DOCUMENTS

| | | | |
|---|---|---|---|
| 10,593,019 B2* | 3/2020 | Jain ........................ | H04N 19/50 |
| 2012/0069047 A1* | 3/2012 | Onoda ................. | H04N 23/633 |
| | | | 345/619 |

FOREIGN PATENT DOCUMENTS

| | | |
|---|---|---|
| JP | 6471698 B2 | 2/2019 |
| WO | 2015/118751 A1 | 8/2015 |

\* cited by examiner

*Primary Examiner* — Phuoc H Doan
(74) *Attorney, Agent, or Firm* — Cowan, Liebowitz & Latman, P.C.

(57) ABSTRACT

An information processing apparatus comprises a decoder, a managing unit which manages storage of history information relating to communication with an image capturing apparatus, a receiving unit which, in a case of communication with the image capturing apparatus, receives an image file held in the image capturing apparatus and saves the image file to a predetermined storage unit; and a display control unit which controls a display of an image of the image file saved to the storage unit, wherein, when displaying an image file stored in the storage unit, the display control unit extracts, from the image file, identification information of the image capturing apparatus, and, based on the extracted identification information and the managed history information, determines whether or not to use the decoder to decode the image file.

10 Claims, 9 Drawing Sheets

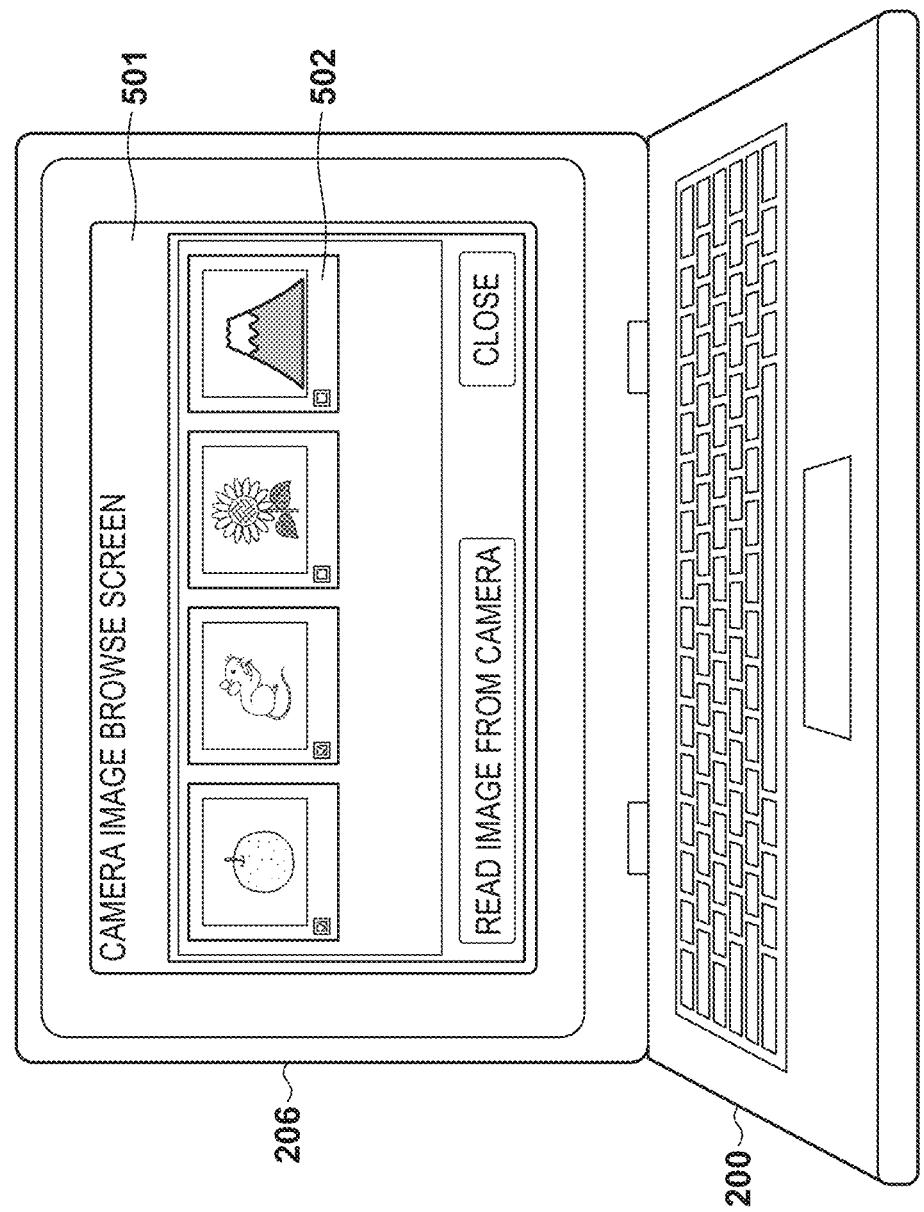

INFORMATION PROCESSING APPARATUS, METHOD OF CONTROLLING THE SAME, NON-TRANSITORY COMPUTER-READABLE STORAGE MEDIUM, AND INFORMATION PROCESSING SYSTEM

BACKGROUND OF THE INVENTION

Field of the Invention

The present invention relates to a technique for displaying image data obtained by communication and encoded using a specific codec.

Description of the Related Art

In recent years, due to the advent of smartphones and personal computers, opportunities for communication utilizing images and videos are increasing. Naturally, there is a desire for attractive images and videos with good tone characteristics.

Recently, digital cameras implementing a function of a high dynamic range (HDR: High Dynamic Range) mode are appearing. Such digital cameras can generate highly compressed images by a 10 bit H.265 (ISO/IEC 23008-2 HEVC) compression format and can provide a photographer with images having a more natural and smooth gradation while suppressing the file size in an HDR mode.

An image capturing apparatus such as a digital camera or an apparatus for displaying images require a library as an HEVC codec for performing HEVC compression encoding on images and for decoding HEVC compressed images (hereinafter, an HEVC image).

For a control apparatus having an HEVC codec, images must be controlled after having obtained a usage right by a royalty charge for a license organization handling HEVC images.

Meanwhile, a user connects a digital camera and a computer and uses a camera connection application that operates on an operating system of the computer to read HEVC images from the digital camera to the computer and display the HEVC images. Also, the user uses an image processing application that executes on a computer to process and adjust the captured HEVC images. In either case, it is necessary for both the digital camera and the computer to have an HEVC codec and it becomes necessary to unify the handling of royalty charges between the image capturing apparatus and the external control apparatus.

As a similar technique to the above, there is literature that discloses techniques such as performing server control for license registration/confirmation work using a means such as an external network, confirming that the images generated by the digital camera are consistent with a usage license of the library used on the computer, and deciding whether to permit control by a library API. Japanese Patent No. 6471698 is an example.

For an application operating on an OS of a computer which is an external control apparatus that handles HEVC images downloaded from a digital camera of an image capturing apparatus which generates HEVC images, a similar HEVC codec to that of the digital camera is necessary, and it is desired that the image capturing apparatus and the external control apparatus be handled together.

Furthermore, when using the HEVC codec, although it is necessary to unify the handling of royalty charges for the license, a digital camera and a computer are connected by wire or wirelessly, and in a case where the power is turned OFF or is cut, a disconnect occurs, and it becomes impossible to control HEVC images that need to be handled by the same HEVC codec.

Accordingly, when performing image control, from generation to display of HEVC images, it is desirable to be able to control the HEVC images after a simple confirmation of a match of HEVC codecs, without an inconvenience such as a connection needing be constantly maintained between an image capturing apparatus and an external control apparatus.

SUMMARY OF THE INVENTION

According to an aspect of the invention, there is provided an information processing apparatus having a communication unit for communicating with an image capturing apparatus having a predetermined codec and having a decoding unit that has a decoding function for decoding encoded image data that is encoded according to at least the predetermined codec, the apparatus comprising: a managing unit configured to manage storage of history information relating to communication with an image capturing apparatus with which communication was performed via the communication unit; a receiving unit configured to, in a case of communication with the image capturing apparatus via the communication unit, receive an image file held in the image capturing apparatus and save the image file to a predetermined storage unit; and a display control unit configured to control a display of an image of the image file saved to the storage unit, wherein the display control unit includes an extracting unit configured to, in a case where an image of an image file of interest stored in the storage unit is to be displayed, extract identification information of the image capturing apparatus which captured the image, by analyzing the image file of interest, and a control unit configured to, based on the identification information obtained by the extracting unit and the history information of the managing unit, control whether or not to use the decoding unit in relation to the image file of interest by determining whether or not the image of the image file of interest is an image captured by an image capturing apparatus that the information processing apparatus has communicate with in the past.

By virtue of the present invention, it is possible to perform a display of captured images when a license for an image codec between image capturing apparatuses is unified.

Further features of the present invention will become apparent from the following description of exemplary embodiments (with reference to the attached drawings).

BRIEF DESCRIPTION OF THE DRAWINGS

FIG. 5 is a view illustrating a state in which the computer is displaying HEVC images in the embodiment.

DESCRIPTION OF THE EMBODIMENTS

Figure 1A:
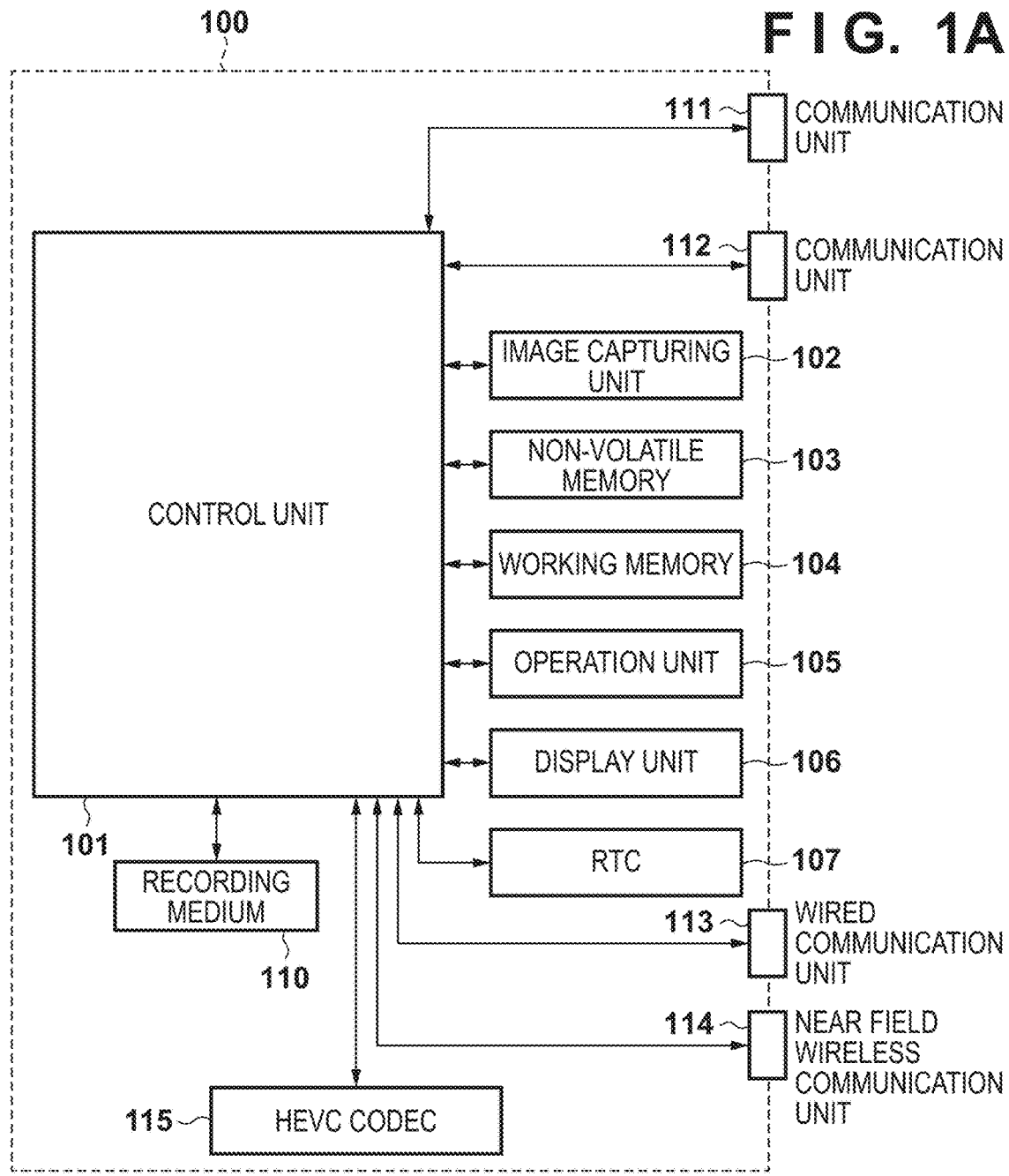
FIGS. 1A to 1C are hardware configuration diagrams of a digital camera in an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1A is a hardware configuration diagram illustrating an example of a configuration of a digital camera 100 which is one example of a communication apparatus of the present embodiment. Note that, here, the digital camera will be described as an example of the communication apparatus, but the communication apparatus is not limited thereto. For example, the communication apparatus may be a mobile media player, or an information processing apparatus such as a so-called tablet device or a personal computer.

A control unit 101 controls the respective units of the digital camera 100 in accordance with inputted signals and programs, which will be described later. Note that, instead of the control unit 101 controlling the entire apparatus, the entire apparatus may be controlled by a plurality of hardware items sharing processing.

An image capturing unit 102 is, for example, configured by an optical system for controlling an optical lens unit, aperture/zoom/focus, and the like, and an image capturing element or the like for converting into an electric video signal an optical image introduced through the optical lens unit and imaged. A CMOS (Complementary Metal Oxide Semiconductor) or a CCD (Charge Coupled Device) is used, in general, as an image capturing element. The image capturing unit 102, by being controlled by the control unit 101, converts subject light, by which an image is formed by the lens included in the image capturing unit 102, into an electric signal using the image capturing element, performs noise reduction processing and the like, and outputs digital data as image data. It is assumed that the digital camera 100 of the present embodiment records image data obtained by capturing to a recording medium 110 in accordance with a DCF (Design Rule for Camera File System) standard.

A non-volatile memory 103 is an electrically erasable/recordable nonvolatile memory, and stores, for example, a program described below that is executed by the control unit 101, various types of parameters, and model-specific information described below (identification information which can uniquely identify a digital camera).

A working memory 104 is used as a buffer memory that temporarily holds image data captured by the image capturing unit 102, an image display memory of a display unit 106, a working area for the control unit 101, or the like.

An operation unit 105 is used for accepting instructions from a user 301 to the digital camera 100. The operation unit 105, for example, includes for the user 301, a power button for instructing an ON/OFF of the power of the digital camera 100, a release switch for instructing to capture an image, and a playback button for instructing a playback of image data. The operation unit 105 further includes an operation member such as a dedicated connection button for starting communication with an external device via a communication unit 111 described below. In addition, the operation unit 105 includes a touch panel formed on the display unit 106 described below. Note, the release switch includes two electronic switches SW1 and SW2. The switch SW1 is turned on by the release switch being in a so-called half-pressed state. When a signal indicating that the switch SW1 has turned ON is accepted, the control unit 101 performs image capturing preparation such as AF (auto focus) processing, AE (auto exposure) processing, AWB (auto white balance) processing, and EF (electronic flash preliminary emission) processing. The switch SW2 is turned on by the release switch being in a so-called fully-pressed state. The control unit 101 performs capturing and recording when a signal indicating that the switch SW2 has turned on is received.

The display unit 106 displays a view finder image at the time of image capturing, displays the captured image data, displays text characters for interactive operation, and the like. Note that the display unit 106 need not be incorporated in the digital camera 100. It is sufficient for the digital camera 100 to be able to connect to an internal or external display unit 106, and to include at least a display control function for controlling display of the display unit 106. Note, the control unit 101, when capturing, HEVC encoding, and recording, as a file, an HDR (High Dynamic Range) image, stores model-specific information to a location set in advance within the file.

An RTC (Real Time Clock) 107 performs clock management. There may be a case in which the time is set by the user 301 using the operation unit 105, time information may be obtained and set via the communication unit 111, or a clock setting captured by a radio wave clock may be used. It is sufficient that the time can be managed.

The recording medium 110 can record image data obtained by capturing by the image capturing unit 102. The recording medium 110 may be configured to be removable from the digital camera 100, or may be built into the digital camera 100. In other words, the digital camera 100 needs only to include at least means for accessing the recording medium 110.

The communication unit 111 is an interface for connecting to an external apparatus. The digital camera 100 according to the present embodiment can exchange data with an external apparatus via the communication unit 111. For example, image data generated by the image capturing unit 102 can be transmitted to the external apparatus via the communication unit 111. Note that, in the present embodiment, it is assumed that the communication unit 111 includes an interface for communication with an external apparatus via a so-called wireless LAN complying with an IEEE 802.11 standard. The control unit 101 implements wireless communication with the external apparatus by controlling the communication unit 111. Note, the communication method also includes an infrared communication method, for example, rather than being limited to wireless LAN. The communication unit 111 is an example of a first wireless communication means.

The communication unit 112 is an interface for connecting to an external apparatus. The digital camera 100 according to the present embodiment can exchange data with an external apparatus via the communication unit 112. For example, image data generated by the image capturing unit 102 can be transmitted to the external apparatus via the communication unit 112. Note that, in the present embodiment, it is assumed that the communication unit 112 includes an interface for communication with an external apparatus via so-called Bluetooth (registered trademark) complying with an IEEE 802.15.1 standard. The control unit 101 implements wireless communication with an external apparatus by controlling the communication unit 112. Note that the communication method is not limited to Bluetooth (registered trademark), and also includes, for example, wireless LAN known by an IEEE 802.11 standard or an infrared communication method. The communication unit 112 is an example of a first wireless communication means.

A wired communication unit 113 is an interface for connecting to the external apparatus. The digital camera 100 according to the present embodiment can exchange data with an external apparatus via the wired communication unit 113. For example, image data generated by the image capturing unit 102 can be transmitted to the external apparatus via the wired communication unit 113. Note, in the present embodiment, the wired communication unit 113 includes an external apparatus and an interface according to the USB (Universal Serial Bus) standard. The control unit 101 implements wired communication with the external apparatus by controlling the wired communication unit 113. Note, the communication method is not limited to USB and includes a wired LAN known by the Ethernet standard, for example. The communication unit 113 is an example of a first wireless communication means.

A near field wireless communication unit 114 is configured from, for example, an antenna for wireless communication, a modulation/demodulation circuit for processing wireless signal, and a communication controller. The near field wireless communication unit 114 implements non-contact near field communication in compliance with an ISO/IEC 18092 standard (so-called NFC: Near Field Communication) by outputting a modulated wireless signal from the antenna, and demodulating a wireless signal received by the antenna. The near field wireless communication unit 114 of the present embodiment is arranged at the side of the digital camera 100.

The digital camera 100 of the embodiment and a computer 200 described later are connected by starting communication by bringing the near field wireless communication unit 114 and a near field wireless communication unit 216 close to each other. Note, in a case where the computer 200 is connected to by using the near field wireless communication unit 114, it is not always necessary that the near field wireless communication unit 114 and the near field wireless communication unit 216 contact. Because the near field wireless communication unit 114 and the near field wireless communication unit 216 can communicate even if separated by a fixed distance, they may approach each other to within a range at which near field wireless communication is possible in order to connect devices together. In the description below, the communication units approaching to within a range at which the near field wireless communication is possible is also referred to as "bringing them close to each other".

Figure 1B:
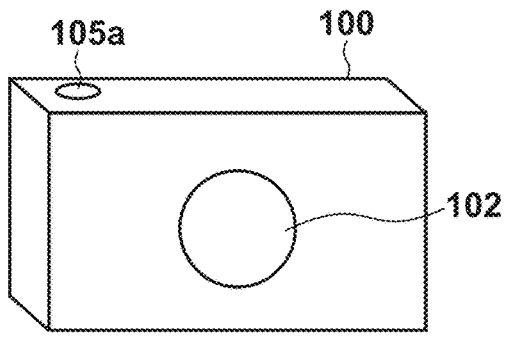
Figure 1C:
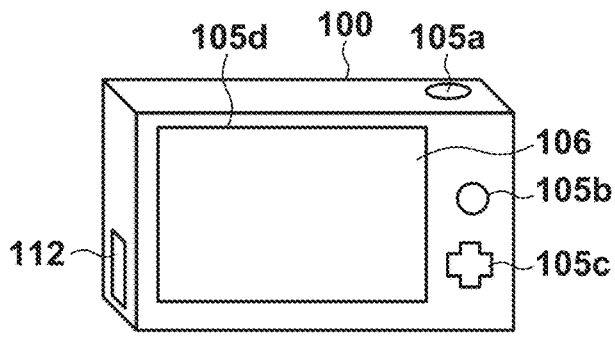

Next, description is given regarding an outer appearance of the digital camera 100. FIGS. 1B and 1C are views illustrating one example of an outer appearance of the digital camera 100. A release switch 105a, a playback button 105b, a direction key 105c, and a touch panel 105d are operation members included in the operation unit 105 described above. An image obtained as the result of capturing performed by the image capturing unit 102 is displayed on the display unit 106. Also, the digital camera 100 of the present embodiment has an antenna portion of the communication unit 112 on the side of the camera housing. Power can be supplied by bringing the communication units 112 close to each other to a fixed distance. By this, it is possible to supply power in a non-contact manner without a cable or the like, and it is possible to control the start and end of power supply.

An HEVC (High Efficiency Video Coding) codec 115 has an encode function for generating an image compressed by H.265 (ISO/IEC 23008-2 HEVC) (hereinafter, an HEVC image) and a decode function for decompression. A control function of the HEVC codec 115 may be installed as hardware or may be installed as software. The digital camera of the embodiment, for when recording an HDR image (an image whose one component exceeds 8 bits) captured in an HDR capturing mode, uses the HEVC codec 115 in order to encode and then records in the recording medium 110. The above is a description of the configuration and the basic operation of the digital camera 100 in the embodiment.

Figure 2:
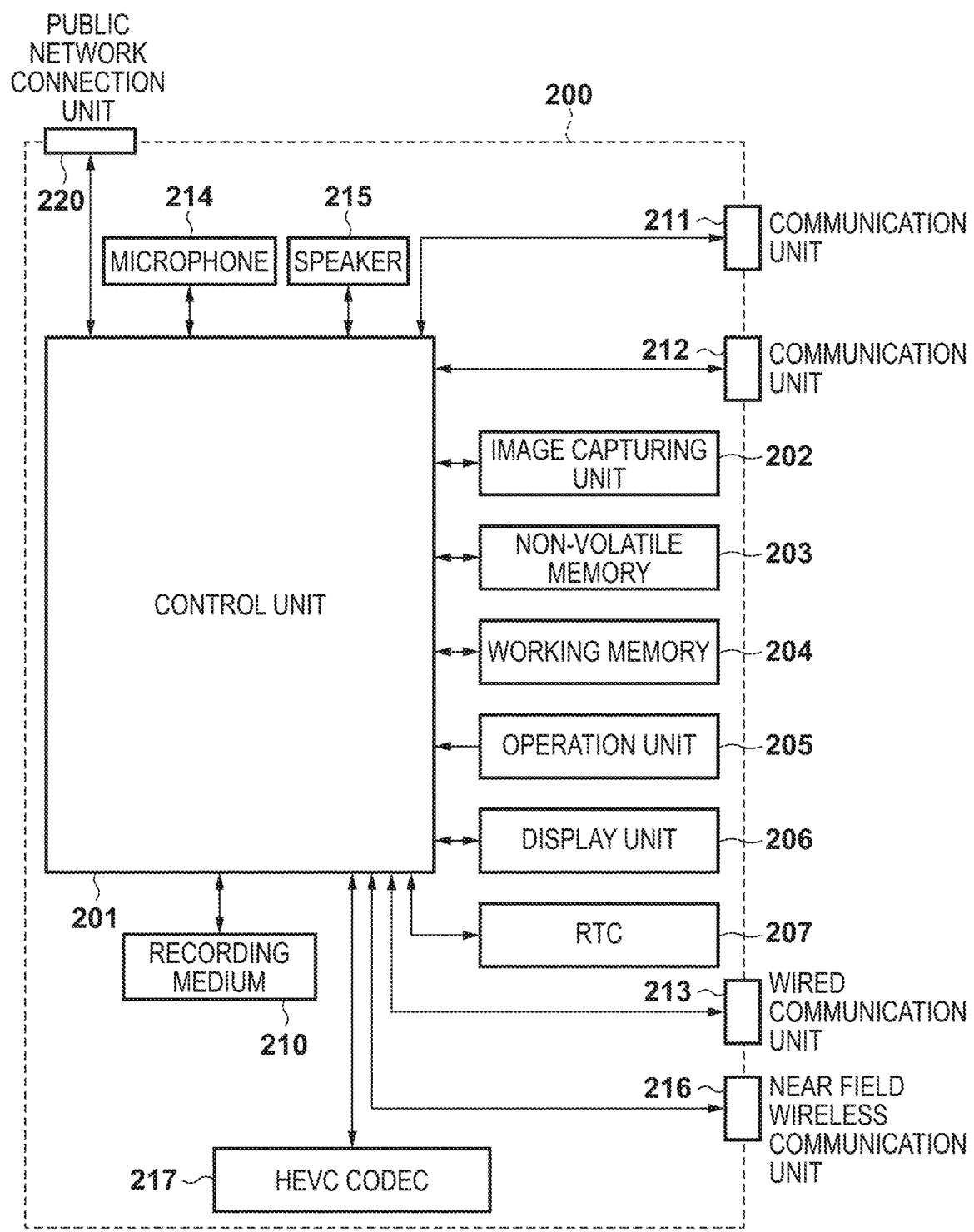
FIG. 2 is a hardware configuration diagram of a computer in the embodiment.

FIG. 2 is a hardware configuration diagram illustrating an example of a configuration of the computer 200 which is one example of the information processing apparatus of the present embodiment. Note that, here, the computer will be described as an example of the information processing apparatus, but the information processing apparatus is not limited thereto. For example, the information processing apparatus may be digital camera with a wireless function, a tablet device, a smartphone, or the like.

A control unit 201 controls the respective units starting with an image capturing unit 202 of the computer 200, in accordance with inputted signals and programs, which will be described later. Note that a plurality of pieces of hardware may control the overall apparatus by sharing processes rather than the control unit 201 controlling the overall apparatus.

Non-volatile memory 203 is non-volatile memory that can be electrically erased and recorded to. In the non-volatile memory 203, an OS (an operating system 801) which is basic software that the control unit 201 executes, and applications that realize practical functions in cooperation with the OS are recorded. Also, in the present embodiment, an application program (hereinafter, simply referred to as "app") for communicating with the digital camera 100 is stored in the non-volatile memory 203.

A working memory 204 is used as an image display memory for a display unit 206, a working area for the control unit 201, or the like.

An operation unit 205 is used to receive instructions from the user 301 in relation to the computer 200. The operation unit 205, for example, includes a power button by which the user 301 instructs ON/OFF of the power of the computer 200, an operation member for setting an RTC 207, and an operation member such as a touch panel in which the display unit 206 is formed.

The display unit 206 displays image data, characters for interactive operation, and the like. Note that the display unit 206 need not always be provided in the computer 200. The computer 200 may connect with the display unit 206, and need only have a display control function for controlling the display of the display unit 206, at the least.

The RTC 207 manages a clock. When the user 301 sets the time via the operation unit 205, time information may be acquired via the communication unit 211, the communication unit 212, or a public network connection unit 213 and set, or a time that is captured by a radio signal clock may be set. The time may be managed. Also, the time may be acquirable by a detection mechanism from a mechanical mechanism such as an analog clock (in such a case, the RTC 207 is assumed to include a detection mechanism from an analog clock).

In a recording medium 210, it is possible for the control unit 201 to record image data received via the communication unit 211 from the digital camera 100. The recording medium 210 may be configured to be removable from the computer 200, or may be built into the computer 200. In other words, the computer 200 may have a means for accessing the recording medium 210 at least.

The communication unit 211 is an interface for connecting with an external apparatus. The computer 200 of the present embodiment can perform exchange of data with the external apparatus via the communication unit 211. In the present embodiment, the communication unit 211 is an antenna, and the control unit 201, via the antenna, can connect with the digital camera 100. Note that, in the present embodiment, it is assumed that the communication unit 211 includes an interface for communication with an external apparatus via a so-called wireless LAN complying with an IEEE 802.11 standard. The control unit 201 implements wireless communication with the external apparatus by controlling the communication unit 211. Note, the communication method also includes an infrared communication method, for example, rather than being limited to wireless LAN. The communication unit 211 is an example of a first wireless communication means.

A communication unit 212 is an interface for connecting to an external apparatus. The computer 200 of the present embodiment can perform exchange of data with the external apparatus via the communication unit 212. For example, image data generated by the digital camera 100 can be received via the communication unit 212. Note that in the present embodiment, the communication unit 212 includes an interface for communication with an external apparatus that conforms to an IEEE 802.15.1 standard, so-called Bluetooth (registered trademark). The control unit 201 implements wireless communication with the external apparatus by controlling the communication unit 212. Note that the communication method is not limited to Bluetooth (registered trademark), and also includes, for example, a wireless LAN known by an IEEE 802.11 standard or an infrared communication method. Also, the communication unit 212 is an example of a first wireless communication means.

A wired communication unit 213 is an interface for connecting with an external apparatus. The computer 200 of the present embodiment can perform exchange of data with an external apparatus via the wired communication unit 213. For example, it is possible to transmit image data generated by the image capturing unit 102 to the external apparatus via the communication unit 213. Note that, in the present embodiment, the communication unit 213 includes an interface according to a USB (Universal Serial Bus) standard with the external apparatus. The control unit 201, by controlling the wired communication unit 213, realizes wired communication with the external apparatus. Note, the communication method is not limited to USB and includes a wired LAN known by the Ethernet standard, for example. Also, the communication unit 213 is an example of a first wired communication means.

The near field wireless communication unit 216 is configured from, for example, an antenna for wireless communication, a modulation/demodulation circuit for processing wireless signals, and a communication controller. The near field wireless communication unit 216 implements non-contact near field communication in compliance with the ISO/IEC 18092 standard (the so-called NFC: Near Field Communication) by outputting a modulated wireless signal from the antenna, and demodulating a wireless signal received by the antenna. The near field wireless communication unit 216 of the present embodiment is arranged at a position of the computer 200 (for example, a side portion) that is set in advance.

An HEVC codec 217 has an encode function for generating an image compressed by H.265 (ISO/IEC 23008-2 HEVC) (hereinafter, an HEVC image) and a decode function for decompression. A control function for the HEVC codec 217 may be implemented as hardware, and may be implemented as software. Also, if the computer 200 only performs display (playback) of HEVC images, configuration may be such that the HEVC codec 217 only has a decoding function.

A public network connection unit 220 performs communication with a public line. At this time, the user can use a microphone 214 and a speaker 215 to perform a call via the public line.

Here, in the description hereinafter, it is described as though the digital camera 100 is the performer of the processing, but actually, the control unit 101 of the digital camera 100 reads a program stored in a non-volatile memory 103, and realizes each kind of process. Also, for parts described as though the computer 200 were the performer of the processing, each kind of process is similarly actually realized by the control unit 201 of the computer 200 reading a program stored in the non-volatile memory 203. Furthermore, the computer 200 has a function by which a control program for connecting with the digital camera 100 can be downloaded from an external interface, such as the communication unit 211, and installed. The computer 200 controls control programs for which the operating system 801 which is a program that controls overall is installed. Also, an application (control program) for making a connection with the digital camera 100 is described as a camera connection application 802.

Also, the camera connection application 802 and the image processing application 803 are described as the performers of processing, but it should be understood that actually, the control unit 201 realizes each kind of processing by reading a program stored in the non-volatile memory 203.

<System Configuration Diagram>

Next, a system configuration diagram in the embodiment will be described.

Figure 3A:
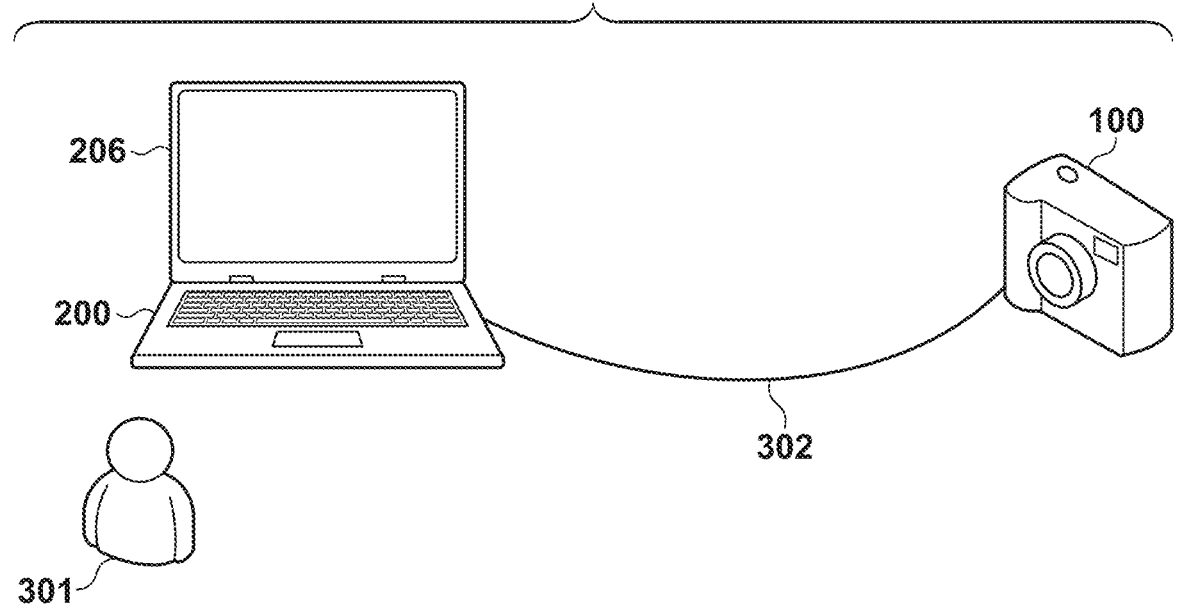
FIGS. 3A and 3B are views illustrating an example of a connection configuration between the digital camera and the computer in the embodiment.
Figure 3B:
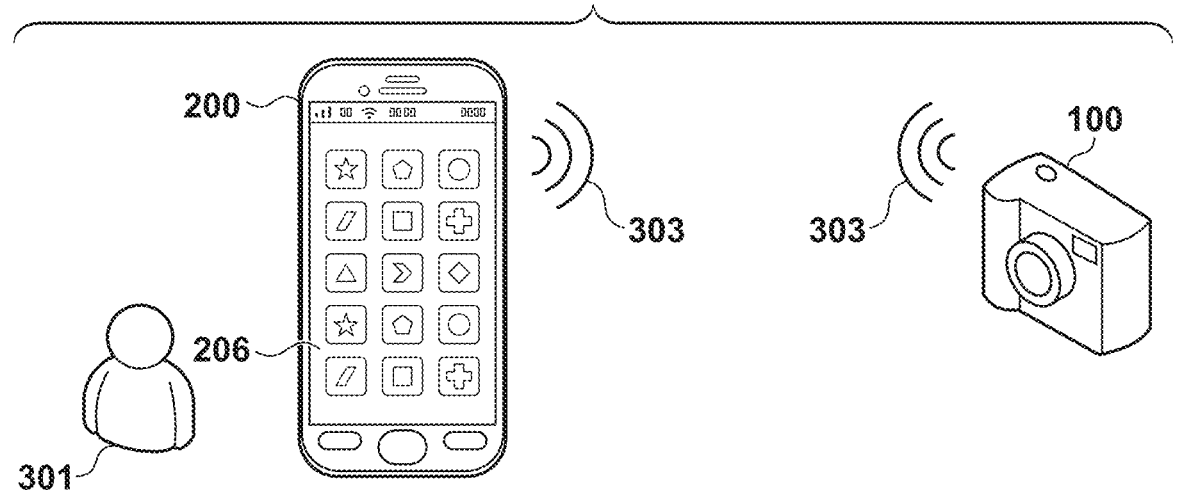

FIGS. 3A and 3B are information processing system configuration diagrams illustrating a situation in which the digital camera 100 which is an image capturing apparatus and the computer 200 which is an external control apparatus are connected, and an HEVC image is passed from the digital camera 100 to the computer 200. FIG. 3A illustrates a configuration in which the user 301 makes a wired connection 302 by USB or wired LAN with the digital camera 100 from the computer 200 which is a personal computer, and an HEVC image is transferred from the digital camera 100 to the computer 200 and displayed. FIG.

3B illustrates a configuration in which the user 301, by the computer 200, which is a smartphone, performs wireless communication 303 with by wireless LAN or Bluetooth with the digital camera 100, an HEVC image is transferred from the digital camera 100 to the computer 200 and displayed.

<HEVC Image Display Control by the Digital Camera and the Computer>

Hereinafter, description will be given for control in a system of the digital camera 100 and the computer 200, in which an HEVC image that the digital camera 100 obtained by capturing is transmitted to the computer 200 to which the digital camera 100 is currently connected (with which it is currently communicating), and the computer 200 displays that HEVC image on the display unit.

In the system configuration illustrated in FIGS. 3A and 3B, when a user inputs an imaging instruction when the digital camera 100 is set to a HDR mode (selection by the operation unit 105), image data that results from image data obtained by the image capturing unit 102 being HEVC-compressed by using the HEVC codec 115 is generated, and recorded as a file in the recording medium 110. In a normal image capturing mode, an 8-bit per component image is JPEG-compressed and recorded. However, in the case of JPEG, it is not possible to encode the image data so as to exceed 8 bits per component. Accordingly, an HEVC compression technique is used for a captured image (for example, 10 bits per component) obtained in the HDR mode.

Image information that conforms to an Exif specification is recorded in an HEVC image saved as a file, and model-specific information (for example, a model ID or the like of the manufacturing number or a camera) of the digital camera 100 that captured the image is recorded.

The user 301 connects the digital camera 100 and the computer 200, and reads the HEVC image held in the digital camera 100 into the computer 200. The computer 200 of the embodiment, when performing this communication, obtains model-specific information 402 of the digital camera 100 by the digital camera 100, and saves (storage management) it in the non-volatile memory 203 as a connection history information 401.

When the computer 200 downloads an HEVC image from the digital camera 100, it decompresses the retrieved HEVC image to return it to image data and displays the image. Therefore, it is necessary for the HEVC codec 217 of the computer 200 to have a function similar to the HEVC codec 115 of the digital camera 100. Accordingly, in the present embodiment, the digital camera 100 and the computer 200 are treated as an integrated system from when the HEVC image is generated to when the HEVC image is displayed.

In the above system, a royalty for generating and displaying of an HEVC image is handled integratedly, but in the case of transmitting an HEVC image to the computer 200 from the digital camera 100 which is the configuration of the present embodiment, the computer 200 compares the model-specific information 402 of the recorded connection history information 401 and the model-specific information recorded in the HEVC image, and if they match, uses the HEVC codec 217 to decode the HEVC image and return to the image data, and then display the image on the display unit 206 of the computer 200.

For the above confirmation work, the HEVC codec 115 of the digital camera 100 and the HEVC codec 217 of the computer have the same function by executing software that operates on the operating system 801 of the computer 200, and it is possible to perform display control treating the royalty as the same.

<Camera Connection History Data Configuration Diagram>

Figure 4:
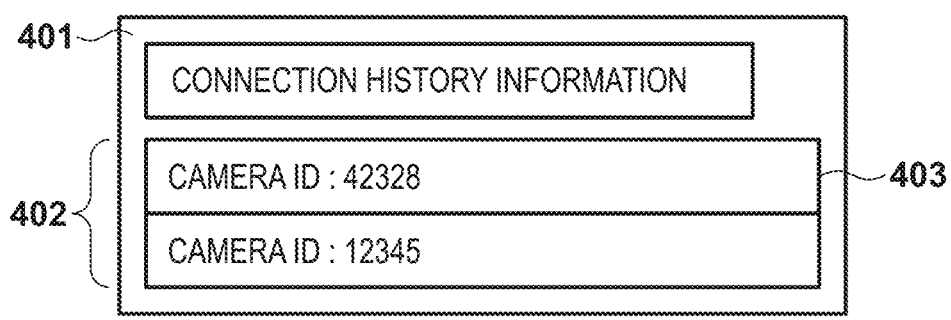
FIG. 4 is a view illustrating a data structure of connection history information in the embodiment.

FIG. 4 is a view that illustrates a data structure of model-specific information of the digital camera 100 that is held in the non-volatile memory 203 of the computer 200. This information is obtained by the computer 200 from the digital camera 100 when the user connects the computer 200 and the digital camera 100. Note that FIG. 4 illustrates that two types of digital camera were connected.

The user 301, having put the digital camera 100 and the computer 200 in a connected state, activates the camera connection application 802 which operates on the operating system 801 of the computer 200.

The camera connection application 802, by communication, obtains this model-specific information from the digital camera 100, and saves it in the non-volatile memory 203 of the computer 200 as the connection history information 401. The camera connection application 802 confirms a connection between the computer 200 and a connection target digital camera 100, and obtains from the digital camera 100 model-specific information of the digital camera 100 in an initial communication with the computer 200.

The camera connection application 802, if model-specific information 403 obtained from the digital camera 100 with which it is connected is not included in a connection history list 402 of camera-specific information 403 recorded in the connection history information 401, adds it to the connection history list 402 and saves it. The form in which it is saved to the non-volatile memory 203 of the computer 200 of the connection history information 401 may be a binary file format or a markup language such as XML or the like. Note that the model-specific information 403 is of a form such as the model ID of the camera, a serial number by which the model can be distinguished, or a version number indicating the type of the HEVC codec.

<HEVC Image Display User Interface>

FIG. 5 is a view in which the computer 200 downloads from the digital camera 100 to the computer 200 HEVC images of a thumbnail size, and displays them in a list on the display unit 206.

The computer 200, confirms the connection history information 401, and using the HEVC codec 217 to convert the images into image data, and then displays the images in a thumbnail display area 502 of a dialog 501 which is a camera image browsing screen.

Although an example in which a list of thumbnail images are displayed is illustrated in the present embodiment, the HEVC images may be displayed not only at the thumbnail size, but also at a main image size or a preview image size. Furthermore, the computer 200 can perform a display of HEVC images in the dialog 501 by referencing the connection history information 401 saved in the computer 200 even if the connection with the digital camera 100 is cut.

<Download and Display of HEVC Images>

Figure 6A:
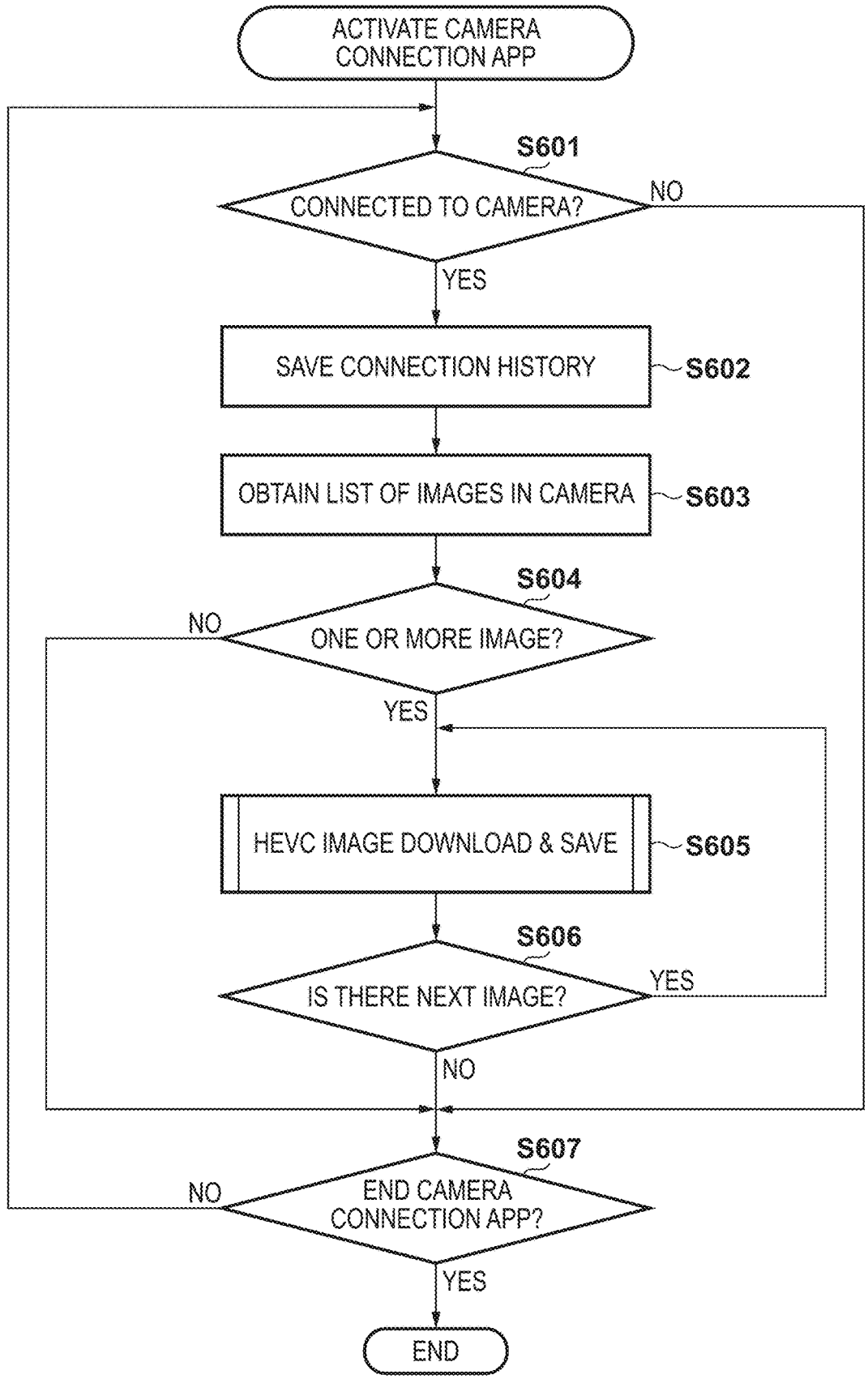
FIG. 6A is a flowchart illustrating camera connection processing by the computer in a first embodiment.

FIG. 6A is a flowchart illustrating the communication processing unit in the camera connection application 802 for the embodiment. This processing is started by the user 301 activating the camera connection application 802 via the operation unit 205.

In step S601, the control unit 201 determines whether or not the digital camera 100 is in a connected state. In a case where the control unit 201 determines that the digital camera 100 is in a connected state, the processing advances to step S602, and in a case where it is determined to be in a non-connection state, the processing advances to step S607.

In step S602, the control unit 201 obtains model-specific information of the connected digital camera 100, writes this information to the connection history information 401, and then the processing advances to step S603.

In step S603, the control unit 201 requests to the currently connected digital camera 100 for an obtainment of a list of images stored in the recording medium 110, obtains an image list (needless to say, the list may be a list of image file names) represented by an index, and then the processing advances to step S604.

In step S604, the control unit 201 determines whether or not an index of one or more images is described within the image list. In a case where the control unit 201 determines that an index of one or more images is included in the image list, the processing advances to step S605, and in a case where it is determined to not be included, the processing advances to step S607.

In step S605, the control unit 201 transmits a transmission request for the relevant image data (encoded image data) to the digital camera 100 by using the index indicated in the image list. As a result, because the digital camera 100 transmits the image data of a designated index, the control unit 201 receives the image data and saves it as a file in the non-volatile memory 203. Then, to prepare for a reception of the next image, the control unit 201 updates the index and the processing advances to step S606.

In step S606, the control unit 201 determines whether or not there are unreceived images based on the updated index and the most recent index of the list of images obtained in step S603. In a case where the control unit 201 determines that there are unreceived images, the processing returns to step S605, and in a case where it determines that every image has been received and completed saving, the processing advances to step S607.

In step S607, the control unit 201 determines whether or not there was an end request for the camera connection application 802 from the user via the operation unit 205. In a case where the control unit 201 determines that an end request was made, the present processing ends, and in a case where it determines that an end request was not made, the processing returns to step S601.

Figure 6B:
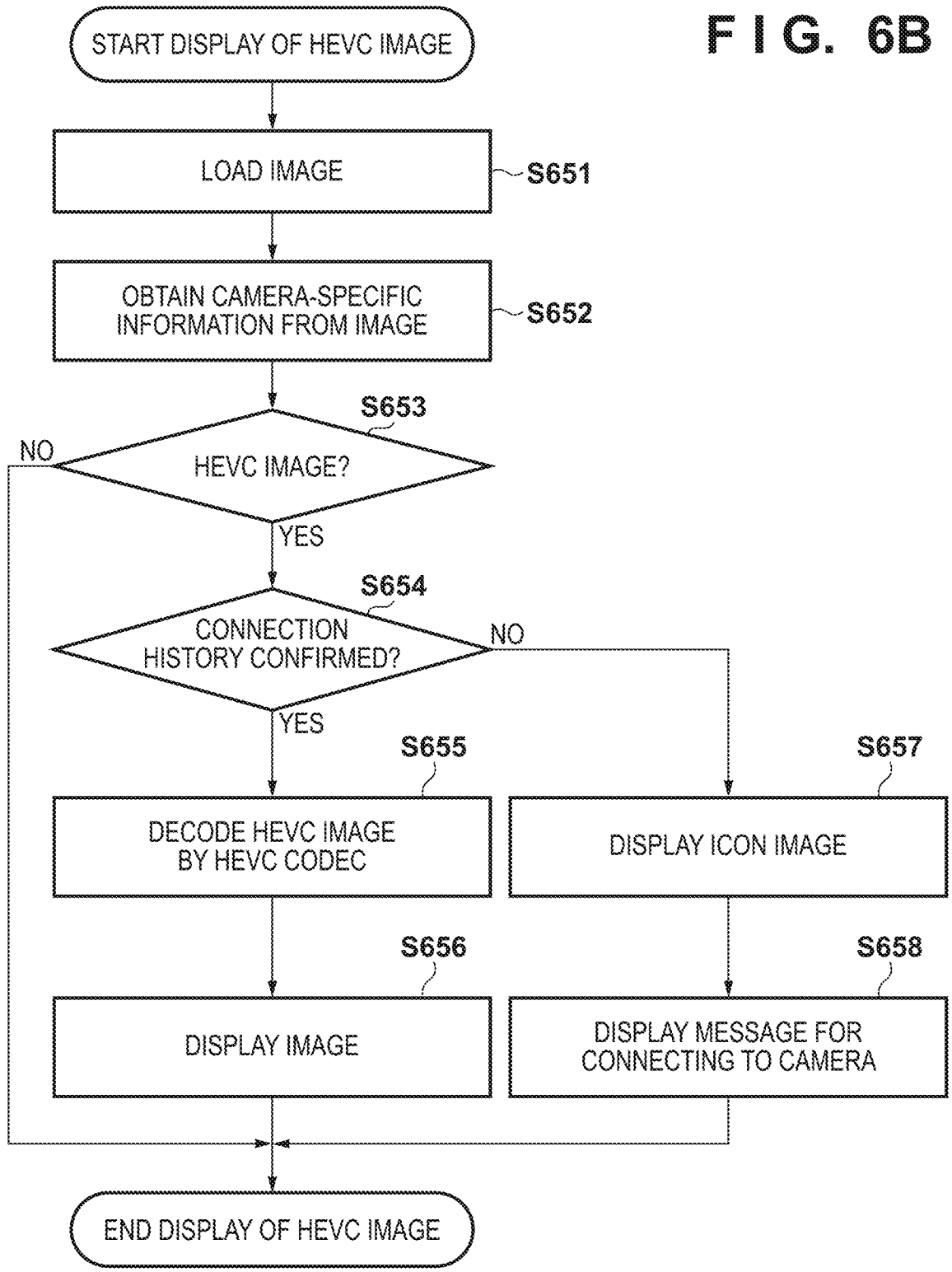
FIG. 6B is a flowchart illustrating image display processing in the first embodiment.

FIG. 6B is a flowchart illustrating the processing of the image browsing application in the embodiment. Note, is assumed that this processing is executed in a case where the user operates the operation unit 205, selects one image file stored in the non-volatile memory 203, and then inputs a display instruction.

In step S651, the control unit 201 obtains from the non-volatile memory 203 data of an image file to be browsed that was selected by the user. Next, in step S652, the control unit 201 extracts model-specific information of the digital camera that did the capturing from information complying with an Exif specification of the obtained data. In step S653, the control unit 201 determines whether or not the obtained image is an HEVC image based on information conforming with the Exif specification. In a case where the control unit 201 determines that the image is an HEVC image, the processing advances to step S654, and in a case where it determines that the image is not an HEVC image, the present processing ends.

In S654, the control unit 201 determines whether or not connection history information 401 already is present in the non-volatile memory 203 of the computer 200 and something that matches the model-specific information described in the image file to be browsed that was extracted in S652 is recorded in the connection history information 401. In a case where the control unit 201 determines that the model-specific information matching the connection history information 401 has been recorded, the processing advances to step S655, and in a case where it is determined that the model-specific information does not match or that the connection history information 401 has not even been generated, the processing advances to step S657. It can be said that the determination of the control unit 201 of S654 is equivalent to determining "whether or not the computer 200 has a past experience of connecting to a digital camera that had captured an image file to be browsed".

In step S655, the control unit 201 decodes the HEVC image to be browsed by using the HEVC codec 217, returns it to image data that can be visualized, and then the processing advances to step S656. Note, configuration may be taken so that enabling/disabling of the HEVC codec 217 can be set from the control unit 201. In such a case, in step S655, the control unit 201 is made to decode the HEVC image to be browsed when the HEVC codec 217 is set to be enabled.

In step S656, the control unit 201 displays an image obtained by decoding to the thumbnail display area 502 of the dialog 501 displayed in the display unit 206.

Meanwhile, in a case where the processing advanced to step S657, the control unit 201 displays the image to be browsed as a predetermined icon image that can be determined to be an HEVC image in the thumbnail display area 502 of the dialog 501, and then the processing advances to step S658. Then, in step S658, the control unit 201 displays a message prompting a connection of the camera holding the model-specific information described in the image file to be browsed in a message display area 704 (with reference to FIG. 7B) and then the present processing ends.

Note, although the present sequence is described as being performed by an application specialized in displaying HEVC images, it also can be applied to thumbnail images in HEVC-compressed videos, trimmed images, and the like.

By virtue of the present embodiment as described above, the owner of the digital camera 100 is enabled to browse within the scope of a license for an HEVC codec of the digital camera 100 on his or her computer 200.

Second Embodiment

An example of displaying a list of HEVC images generated from a plurality of digital cameras of differing models corresponding to the HDR mode on the display unit 206 of the computer 200 is described as the second embodiment.

Figure 7A:
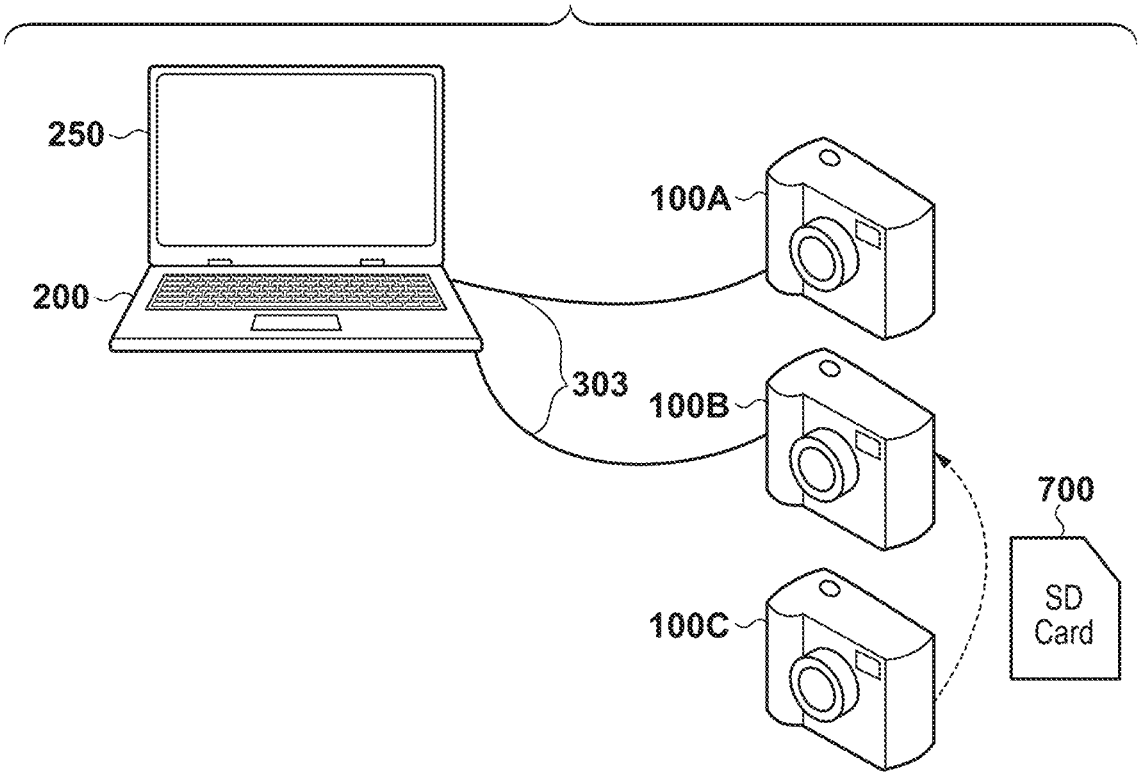
FIG. 7A is a view illustrating an example of a plurality of digital cameras connected to the computer in a second embodiment.

For FIG. 7A, it is assumed that a digital camera 100A, a digital camera 100B, and a digital camera 100C which are not the same model are present and each have a HEVC codec. It is assumed that the determination of the type of the HEVC codec is made by the model-specific information included in the HEVC image, and whether or not it can be decoded can be confirmed by whether or not the version of the HEVC codec on the decoding side is newer than the version described in the HEVC image to be decoded. It is assumed that the version becomes the most recent state by the HEVC codec 217 within the computer 100 in the second embodiment using an update program supplied from the manufacturer of the digital camera.

Further, FIG. 7A illustrates that the digital cameras 100A and 100B have had an experience of being connected to the computer 200 (it does not matter whether it was a wired or wireless connection), and the remaining digital camera 100C has not had this experience (communication experience is okay). Furthermore, the figure illustrates that the digital camera 100B is connected to the computer 200 when a recording medium 700 which includes an image file captured and recorded by the digital camera 100C connected to the digital camera 100B.

When the camera connection application 802 operating on the operating system 801 of the computer 200 is executed and the digital camera 100A is connected to the computer 200, the control unit 201 of the computer 200 downloads the image file held in the digital camera 100A and saves it to the non-volatile memory 203. Similarly, when the digital camera 100B is connected to the computer 200 and the camera connection application 802 is executed, the control unit 201 downloads the image file held in the digital camera 100A and saves it to the non-volatile memory 203.

In the above-described situation, the model-specific information of the digital cameras 100A and 100B are recorded and the model-specific information of the digital camera 100C is not recorded to the connection history list 402 in the connection history information 401 which is held in the non-volatile memory 203 of the computer 200. Meanwhile, in addition to the HEVC image file captured by the digital cameras 100A and 100B, the HEVC image file captured by the digital camera 100C is stored in the non-volatile memory 203 of the computer 200. Based on these points, processing according to a display of a list of image files in the second embodiment is described below.

Figure 7B:
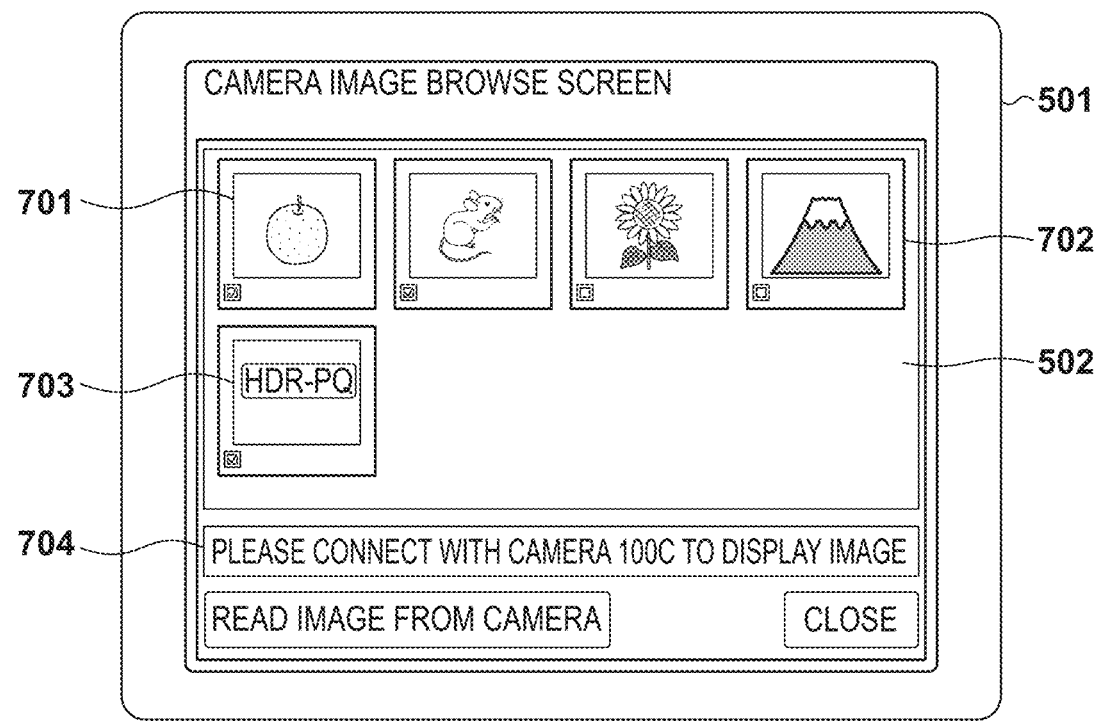
FIG. 7B is a view illustrating an example of a display of a list of images.

FIG. 7B illustrates the dialog 501 of a list of images which is displayed on the computer 200 when an application for displaying a list of HEVC images is executed.

As described above, when this application is executed, the control unit 201 displays a list of the HEVC image files saved in the non-volatile memory 203. At that time, the control unit 201 analyzes an HEVC image file of interest and determines whether or not the model-specific information extracted from information complying to the Exif specification is recorded within the connection history list 402 in the connection history information 401. Then, in a case where the model-specific information which was extracted from and complies with the HEVC image file of interest is recorded within the connection history list 402, the control unit 201 displays a thumbnail image of the HEVC image file of interest as a list display element icon. Icons 701 and 702, and the like of FIG. 7B correspond to this. Note, the thumbnail images may be stored in a location defined in advance in the HEVC image files, or may be created by images decoded by using the HEVC codec 217 being reduced. Also, in a case where the user 301 performs an operation by, for example, the operation unit 205, such as a double-clicking of the icon 701, and the control unit 201 decodes the HEVC image file corresponding to the icon 701 by using the HEVC codec 217 and displays the HEVC image (an original resolution image).

Meanwhile, in the list display processing, in a case where the model-specific information extracted from the HEVC image file of interest has not been recorded within the connection history list 402, the control unit 201 displays an icon set in advance as a list display element for the HEVC image file of interest. An icon 703 of FIG. 7B corresponds to this. Also, even if the user 301 double-clicks the icon 703 by operating the operation unit 205, the control unit 201 does not decode the HEVC image file corresponding to the icon 703. Instead, the control unit 201 displays a message prompting a connection with the digital camera 100C (a digital camera holding the model-specific information) as illustrated in the message display area 704 of the figure, and the processing is ended.

Note, the application for displaying a list of HEVC images in the second embodiment may make an image file of interest for each of the plurality of HEVC image files that is saved, and repeat the processing illustrated in the flowchart of FIG. 6B once for each of the number of files.

However, the processing of step S655 is "generate (or extract) a thumbnail of the HEVC image" and is "display a thumbnail" in step S656. Also, step S658 is removed. Step S658 is processing for a case in which an operation in which a double-click for displaying an HDR image of the HEVC image is performed and for a case in which a situation in which consistency between the HEVC codec of the digital camera and the HEVC codec of the computer cannot be confirmed is determined.

By virtue of the second embodiment as described above, contents of an HEVC image are not displayed in a state in which consistency between the HEVC codec of the digital camera and the HEVC codec of the computer cannot be confirmed. As a result, it is possible to eliminate the need to double charge the user who purchased the digital camera, or the digital camera, for the HEVC codec royalty. Furthermore, the user 301 can easily confirm, by the message of the message display area 704, the type of the digital camera 100C to be paired with the computer 200 in order to display the HEVC images.

Third Embodiment

An example in which the camera connection application 802 operating on the operating system 801 of the computer 200 passes an HEVC image downloaded from the connected the digital camera 100 and saved to the image processing application 803 and uses a connection history to perform image processing by utilizing the HEVC codec 217 is described as the third embodiment.

Figure 8:
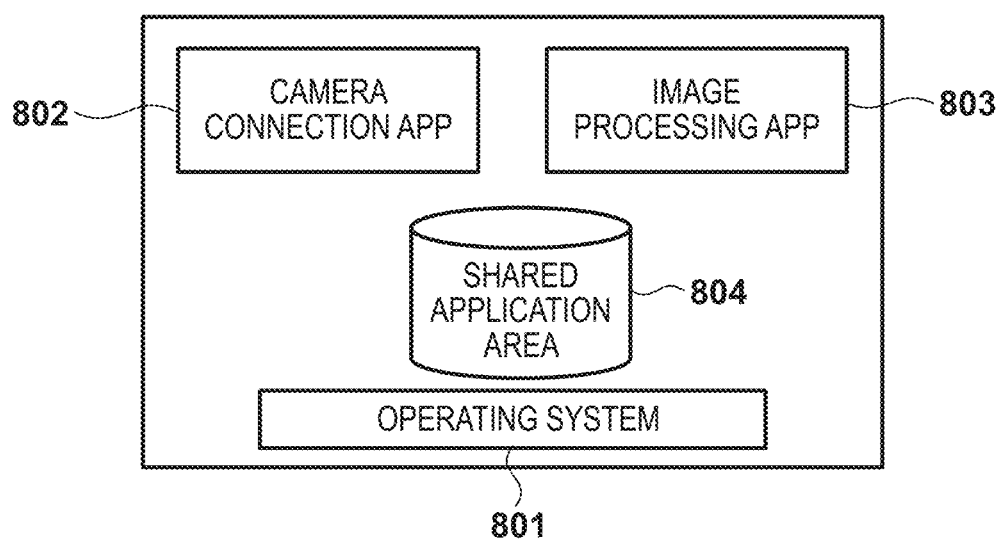
FIG. 8 is a view illustrating a relationship between a camera connection application, an image processing application, and a shared area in a third embodiment.

FIG. 8 is a configuration diagram of main software in the computer 200 in the third embodiment. The computer 200 includes the camera connection application 802 which operates on the operating system 801 and the image processing application 803 which performs image processing for HEVC images. Also, the computer 200 has a shared application area 804 which both applications share. The operating system 801, the camera connection application 802, and the image processing application 803 are stored in the non-volatile memory 203. When the power of the computer 200 is turned on, the control unit 201 executes a boot program (not shown) of the non-volatile memory 203, loads the operating system into the working memory 204, and transfers control to the operating system 801. Then, the control unit 201, under the control of the operating system 801, loads the camera connection application 802 and the image processing application 803 to the working memory 204 and executes them.

In the above-described configuration, when the control unit 201 executes the camera connection application 802 and confirms a connection with the digital camera 100, in a case where the shared application area 804 is not present in the non-volatile memory 203, the connection history information 401 is generated and saved. As a result, the image processing application 803 can reference the connection history information 401 saved in the shared application area 804. In other words, for the image processing application 803, control according to image processing of HEVC images received via the camera connection application 802 becomes possible.

<Sequence for Displaying HEVC Images Link to a Plurality of Applications>

Figure 9:
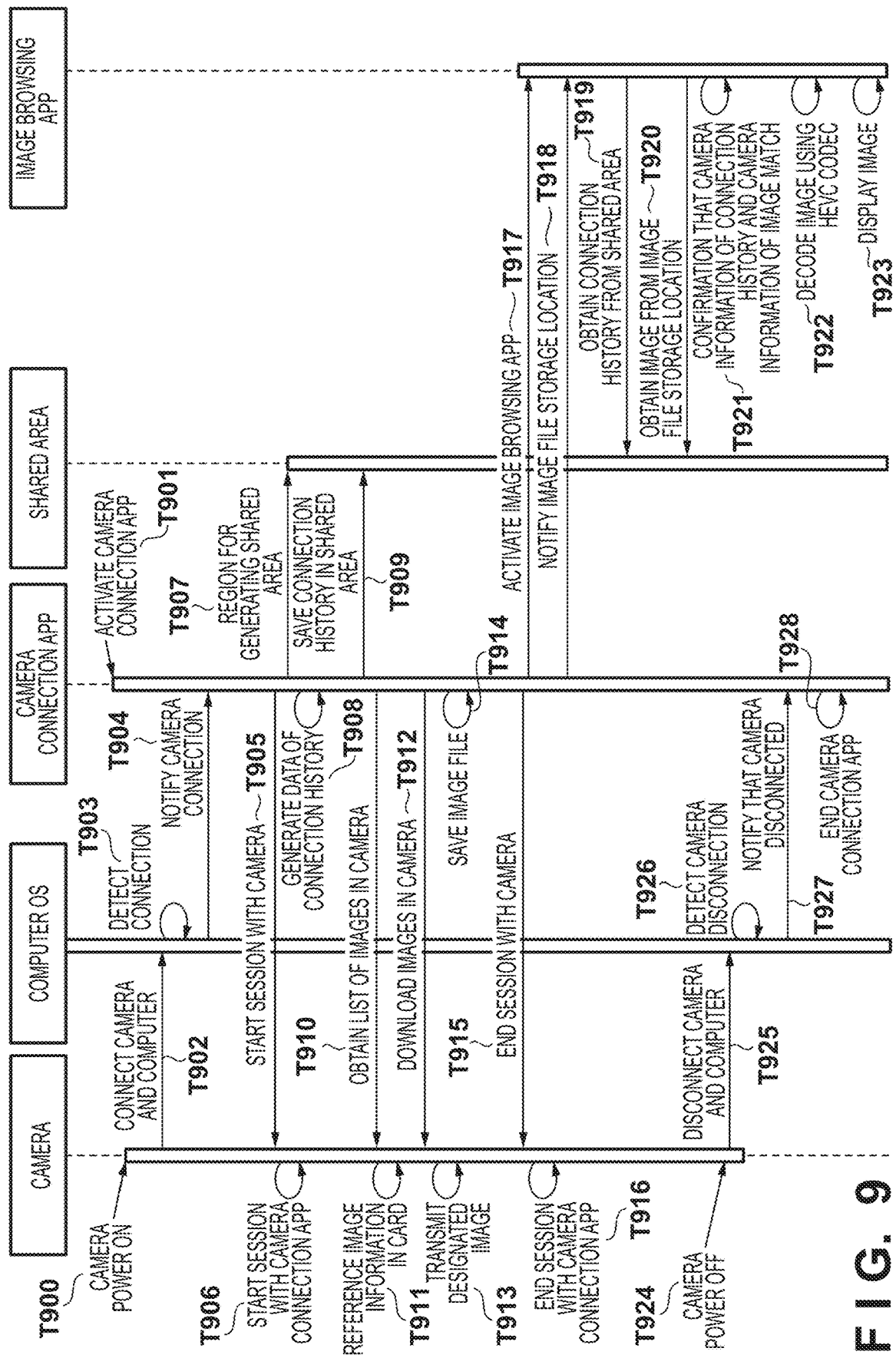
FIG. 9 is a view for describing a processing sequence of a system in the third embodiment.

Next, description is given, with reference to the sequence of FIG. 9, of processing including a communication relationship between the camera connection application 802 and the image processing application 803. Note that Txxx (xxx is a number) of the figure indicates a timing.

At T900, the user 301 turns on the power of the digital camera 100 and can perform a connection with the computer 200.

At T901, the user 301 activates the camera connection application 802, a control program of the computer 200, which allows a connection with the digital camera 100. When the camera connection application 802 is activated, the control unit 201 accepts control from the user 301 by transitioning to the foreground.

At T902, the user 301 makes a wired connection, such as USB, or a wireless connection, such as wireless LAN, between the digital camera 100 and the computer 200.

At T903, the control unit 201 detects a connection with the digital camera 100 via the operating system 801.

At T904, the control unit 201 makes a notification to the camera connection application 802 of information of the connection with the digital camera 100 via the operating system 801.

At T905, the control unit 201 performs, in accordance with the camera connection application 802, communication for starting a session with the digital camera 100 for which a connection was detected.

At T906, the control unit 101 of the digital camera 100 receives the request for a session of the camera connection application 802 of the computer 100 side, starts the session, and performs an initialization communication.

At T907, the control unit 201, in accordance with the camera connection application 802, generates the shared application area 804 if it is not present in the non-volatile memory 203 (may be the recording medium 210).

At T908, the control unit 201, in accordance with the camera connection application 802, generates the connection history information 401 if the connection history information 401 is not present in the shared application area 804. Also, the control unit 201, in accordance with the camera connection application 802, additionally records to the connection history information 401 the model-specific information 403 obtained from the digital camera 100 to which the connection is made. Note that configuration may also be taken such that, at that time, if the same information as the model-specific information obtained from the digital camera that is currently being connected to is already stored in the connection history information 401, it is not recorded.

As T910, the control unit 201, in accordance with the camera connection application 802, makes a request for a list of image information in the camera to the digital camera 100.

At T911, the control unit 101 of the digital camera 100, in accordance with the request by the camera connection application 802, makes a list of image information for each of the images saved in the recording medium 110, and transmits it to the computer 200.

At T912, the control unit 201, in accordance with the camera connection application 802, based on the list of image information in the camera obtained from the digital camera 100, selects one HEVC image and makes a download request therefor to the digital camera 100.

At T913, the control unit 101 of the digital camera 100 extracts the HEVC image selected by the camera connection application 802 from the recording medium 110, and transmits it to the computer 200.

At T914, the control unit 201, in accordance with the camera connection application 802, first saves the HEVC image obtained from the digital camera 100 in the non-volatile memory 203 (or may also be the recording medium 210) of the computer 200.

Note that after that, if there are a plurality of HEVC images to be displayed, the processing of T912 through T914 repeats.

At T915, the control unit 201, in accordance with the camera connection application 802, notifies a request for a termination of the session with the digital camera 100, and performs a communication termination process with the digital camera 100.

At T916, the control unit 101 of the digital camera 100 receives a request for a session termination from the camera connection application 802, and performs the communication termination process with the camera connection application 802.

At T917, the control unit 201, in accordance with the camera connection application 802, activates the image processing application 803, and by coordination between applications, makes them notify each other.

At T918, the control unit 201, in accordance with the camera connection application 802, notifies to the image processing application 803 the location of the HEVC image saved in the non-volatile memory 203 (or the recording medium 210).

At T919, the control unit 201, in accordance with the image processing application 803, references the connection history information 401 saved in a shared region 804, and obtains the model-specific information 403 of the digital cameras 100 to which there had been a connection previously.

At T920, the control unit 201, in accordance with the image processing application 803, obtains an HEVC image from information of the storage location of the HEVC image received by the camera connection application 802.

At T921, the control unit 201, in accordance with the image processing application 803, extracts the model-specific information from the HEVC image, and by sequentially comparing it with the model-specific information 403 in the list 402 of the model-specific information of the connection history information 401, determines whether or not there is a match.

At T922, the control unit 201, in accordance with the image processing application 803, the HEVC image is decoded by using an HEVC codec corresponding to the matching model, and generates the image data for output.

At T923, the control unit 201, in accordance with the image processing application 803, displays on the display unit 206 the generated image data.

At T924, when the user 301 turns OFF the power of the digital camera 100, the control unit 101 of the digital camera 100 makes a notification of the power disconnection to the computer 200.

At T925, the control unit 201, in accordance with the image processing application 803, receives a notification of a power disconnection of the digital camera 100, and performs processing for disconnecting communication with the digital camera 100.

At T926, the control unit 201, via the operating system 801 of the computer 200, detects a disconnection with the digital camera 100. Also, by the control unit 201, at T927, the operating system 801 makes a notification in relation to the camera connection application 802 of disconnection of the camera. At T928, the control unit 201, in accordance with the camera connection application 802, performs processing for ending the camera connection application 802.

By the above procedure, in the computer 200, it becomes possible for the HEVC image that was downloaded from the digital camera 100 to be passed to the image processing application from the camera connection application 802, and the image processing application 803 displays the received HEVC image.

The present embodiment of the sequence illustrates an example in which the image processing application 803 displays the HEVC image by using a decode function of the HEVC codec 217, but configuration may also such that an HEVC image is newly generated as the result of using an encoding function of the HEVC codec 217 to perform image editing such as reduction processing or brightness adjustment on the HEVC image received from the camera connection application 802.

In each embodiment described above, the target of the license common to the digital camera and the computer is described as an HEVC codec, but the invention can similarly be applied to other image formats such as H.264 or the like, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-209007, filed Nov. 19, 2019 which is hereby incorporated by reference herein in its entirety.

What is claimed is:

1. An information processing apparatus having a communication interface for communicating with an image capturing apparatus having a predetermined codec, the apparatus comprising:
   one or more processors that execute a program stored in a memory and thereby function as:
      a decoding unit that has a decoding function for decoding encoded image data that is encoded according to at least the predetermined codec;
      a managing unit configured to manage storage of history information relating to communication with an image capturing apparatus with which communication was performed via the communication unit;
      a receiving unit configured to, in a case of communication with the image capturing apparatus via the communication unit, receive an image file held in the image capturing apparatus and save the image file to a predetermined storage medium;
      a display control unit configured to control a display of an image of the image file saved to the storage medium;
      an extracting unit configured to, in a case where an image of an image file of interest stored in the storage medium is to be displayed, extract identification information of the image capturing apparatus which captured the image, by analyzing the image file of interest; and
      a control unit configured to, based on the identification information obtained by the extracting unit and the history information of the managing unit, control whether or not to use the decoding unit in relation to the image file of interest by determining whether or not the image of the image file of interest is an image captured by an image capturing apparatus that the information processing apparatus has communicate with in the past.

2. The apparatus according to claim 1, wherein when communication with the image capturing apparatus via the communication unit is started, the managing unit obtains identification information from the image capturing apparatus with which communication is being performed and manages storage of the obtained identification information as the history information.

3. The apparatus according to claim 1, wherein the control unit
   displays, in a case where the control to use the decoding unit is performed, an image obtained by decoding, by the decoding unit, in relation to the image file of interest, and
   displays, in a case where the control to not use the decoding unit is performed, an image set in advance in place of an image of the image file of interest.

4. The apparatus according to claim 3, wherein the control unit further displays, in a case the decoding unit is not used in relation to the image file of interest, a message prompting a connection with an image capturing apparatus having the identification information extracted from the image file of interest.

5. The apparatus according to claim 1, wherein the display control unit controls display of a list of image files saved in the storage medium,
   wherein the control unit:
   displays, in a case where the control to use the decoding unit is performed, a thumbnail of an image obtained by decoding according to the decoding unit in relation to the image file of interest as an icon, and
   displays, in a case where the control to not use the decoding unit is performed, an icon set in advance in place of the image file of interest.

6. The apparatus according to claim 5, wherein one or more processor further function as a display processing unit configured to display, in a case where an instruction by a user is made for one icon displayed in the list and an image file corresponding to the instructed icon is a thumbnail created by using the decoding unit, the image file decoded by the decoding unit, and display, in a case where an instruction by a user is made for one icon displayed in the list and the instructed icon is an icon set in advance, a message prompting connection of an image capturing apparatus having the identification information extracted from the image file.

7. The apparatus according to claim 1, wherein the codec is HEVC (High Efficiency Video Coding), and
the image that the image file indicates an HDR (High Dynamic Range) image.

8. A method of controlling an information processing apparatus having a communication interface for communicating with an image capturing apparatus having a predetermined codec, and further having a decoding function for decoding encoded image data that is encoded according to at least the predetermined codec, the method comprising:
(a) managing storage of history information relating to communication with an image capturing apparatus with which communication was performed via the communication interface;
(b) in a case of communication with the image capturing apparatus via the communication interface, receiving an image file held in the image capturing apparatus and save the image file to a predetermined storage medium;
(c) in a case where an image of an image file of interest stored in the storage medium is to be displayed, extracting identification information of the image capturing apparatus which captured the image, by analyzing the image file of interest; and
(d) based on the identification information obtained in the extracting (c) and the history information managed in the managing (a), controlling whether or not to use the decoding function in relation to the image file of interest by determining whether or not the image of the image file of interest is an image captured by an image capturing apparatus that the information processing apparatus has communicate with in the past.

9. A non-transitory computer-readable storage medium storing a computer program which, when read and executed by a computer, causes the computer to execute the steps of a method of controlling an information processing apparatus having a communication interface for communicating with an image capturing apparatus having a predetermined codec, and further having a decoding function for decoding encoded image data that is encoded according to at least the predetermined codec, the method comprising:
(a) managing storage of history information relating to communication with an image capturing apparatus with which communication was performed via the communication interface;
(b) in a case of communication with the image capturing apparatus via the communication interface, receiving an image file held in the image capturing apparatus and save the image file to a predetermined storage medium;
(c) in a case where an image of an image file of interest stored in the storage medium is to be displayed, extracting identification information of the image capturing apparatus which captured the image, by analyzing the image file of interest; and
(d) based on the identification information obtained in the extracting (c) and the history information managed in the managing (a), controlling whether or not to use the decoding function in relation to the image file of interest by determining whether or not the image of the image file of interest is an image captured by an image capturing apparatus that the information processing apparatus has communicate with in the past.

10. An information processing system having
an image capturing apparatus that has a predetermined codec, and
an information processing apparatus,
wherein the information processing apparatus comprises:
a communication interface for communicating with the image capturing apparatus,
one or more processors that execute a program stored in a memory and thereby function as:
a decoding unit that has a decoding function for decoding encoded image data that is encoded according to at least the predetermined codec;
a managing unit configured to manage storage of history information relating to communication with an image capturing apparatus with which communication was performed via the communication interface;
a receiving unit configured to, in a case of communication with the image capturing apparatus via the communication interface, receive an image file held in the image capturing apparatus and save the image file to a predetermined storage medium;
a display control unit configured to control a display of an image of the image file saved to the storage medium;
an extracting unit configured to, in a case where an image of an image file of interest stored in the storage medium is to be displayed, extract identification information of the image capturing apparatus which captured the image, by analyzing the image file of interest; and
a control unit configured to, based on the identification information obtained by the extracting unit and the history information of the managing unit, control whether or not to use the decoding unit in relation to the image file of interest by determining whether or not the image of the image file of interest is an image captured by an image capturing apparatus that the information processing apparatus has communicate with in the past.

* * * * *